US009690361B2

(12) United States Patent
Elibol et al.

(10) Patent No.: US 9,690,361 B2
(45) Date of Patent: Jun. 27, 2017

(54) LOW-POWER CONTEXT-AWARE CONTROL FOR ANALOG FRONTEND

(71) Applicant: Intel Corporation, Santa Clara, CA (US)

(72) Inventors: Oguz H Elibol, Sunnyvale, CA (US); Varvara Roula Kollia, Santa Clara, CA (US); Esha John, New York, NY (US); Ryan M Field, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 14/583,049

(22) Filed: Dec. 24, 2014

(65) Prior Publication Data
US 2016/0187961 A1 Jun. 30, 2016

(51) Int. Cl.
G06F 9/24 (2006.01)
G06F 1/32 (2006.01)
G06F 13/40 (2006.01)
G06F 9/46 (2006.01)
G06F 9/54 (2006.01)
G06F 3/041 (2006.01)

(52) U.S. Cl.
CPC .......... G06F 1/3293 (2013.01); G06F 3/0416 (2013.01); G06F 9/461 (2013.01); G06F 9/54 (2013.01); G06F 13/4022 (2013.01); *G06F 2203/04106* (2013.01)

(58) Field of Classification Search
CPC ..... G06F 3/0481; G06F 13/42; G06F 17/5036
USPC .................................. 713/323, 1, 2
See application file for complete search history.

(56) References Cited

U.S. PATENT DOCUMENTS

| 2007/0270671 | A1 | 11/2007 | Gal |
| 2012/0023354 | A1 | 1/2012 | Chino |
| 2012/0095622 | A1 | 4/2012 | Lynch et al. |
| 2012/0254878 | A1* | 10/2012 | Nachman .............. G06F 9/5094 718/102 |

(Continued)

FOREIGN PATENT DOCUMENTS

WO  2013123359 A2  8/2013

OTHER PUBLICATIONS

International Search Report and Written Opinion for PCT Patent Application No. PCT/US2015062833, Mailed Mar. 18, 2016, 14 pages.

*Primary Examiner* — Vincent Tran
(74) *Attorney, Agent, or Firm* — Compass IP Law PC

(57) ABSTRACT

An analog frontend (AFE) interface is dynamically programmable based on a determined operating state. The AFE includes hardware to interface with multiple different sensors. The AFE includes analog processing hardware that can select input data from one of the multiple sensors. The analog processing hardware is coupled to a processor that computes features from the sensor, where the features represent selected operating condition information of the AFE for the sensor. The processor is to determine one of multiple discrete operating states of the AFE for the sensor based on the computed features and dynamically adjust operation of the AFE to interface with the sensor based on the determined operating state. Dynamically adjusting the operation of the AFE includes controlling a configuration of the AFE that controls how the AFE receives the input sensor data from the sensor.

22 Claims, 8 Drawing Sheets

(56) References Cited

U.S. PATENT DOCUMENTS

| | | | |
|---|---|---|---|
| 2013/0002410 A1* | 1/2013 | Fanaswalla | H04B 1/10 340/13.37 |
| 2013/0185675 A1* | 7/2013 | Perry | G06F 3/0481 715/832 |
| 2013/0332139 A1* | 12/2013 | Koga | G06F 17/5022 703/14 |
| 2014/0156269 A1* | 6/2014 | Lee | G06F 1/3206 704/231 |
| 2014/0267799 A1 | 9/2014 | Sadasivam et al. | |
| 2015/0269954 A1 | 9/2015 | Ryan et al. | |
| 2015/0378954 A1* | 12/2015 | Field | G06F 1/266 710/69 |

* cited by examiner

LOW-POWER CONTEXT-AWARE CONTROL FOR ANALOG FRONTEND

FIELD

Embodiments of the invention are generally related to I/O interfaces, and more particularly to context-aware control for a dynamically configurable analog frontend circuit.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright ©2014, Intel Corporation, All Rights Reserved.

BACKGROUND

There has been a significant increase in the number of mobile devices, and the range of functionality provided by these devices. Mobile devices can include such devices as smartphones, wearable devices such as augmented reality headsets or similar devices, watches, or other wearable devices, and handheld computing, reading, and/or gaming devices. These mobile devices provide improved user interfacing and increased functionality by an increasing number of sensors or environmental detection equipment (generally referred to herein as sensors). Many sensors generate an analog output (either a variable voltage and/or a variable current output) that must be first converted to digital form before it can be processed by digital processing components (microcontrollers, digital signal processors, or other processing devices). Examples of sensors can include motion sensors, accelerometers, temperature sensors, gyroscopes, location sensors, light detectors, sound/noise detectors, or other sensors.

Many of the sensors are incorporated into mobile devices where the user has an "always-on" expectation of the device. Thus, a device may be designed to track motion or respond to changes in environment, movement, or other conditions with either no delay or delay that is imperceptible to the end user. The always-on operation of devices with sensors is traditionally accomplished by corresponding always-on amplification of analog signals and analog to digital conversion of the sensor inputs. However, such always-on operation demands power. Decreasing form factors are required to integrate more sensors and more interfaces into modern device. However, as form factors decrease, the electronic components are created with smaller features with inherently smaller gain. Such components must be driven harder to provide adequate signal amplification for the sensors.

Additionally, not all sensors require the same performance from the AFE. Some sensors do not require certain blocks of components to be active to produce an adequate input signal. Certain sensors require higher bandwidth and/or higher gain and/or higher sampling rates than other sensors. However, traditional consolidated AFEs are configured to provide operation for worst-case inputs, and/or are configured for general purpose use and consume too much power for modern wearable or mobile devices (e.g., above a 1 mW power budget). To the extent consolidation has been attempted in AFEs, traditional solutions are not scalable to large numbers of simultaneously recorded sensors without a significant power penalty.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, and/or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
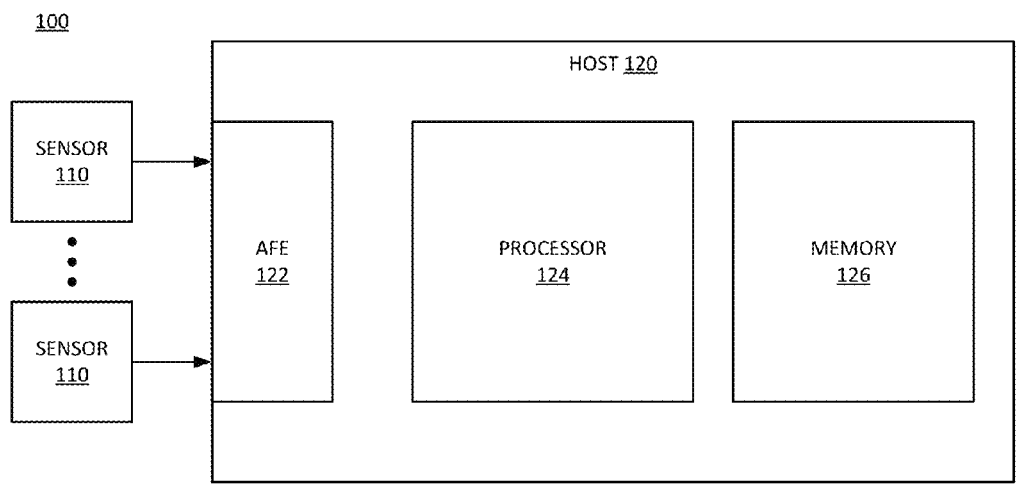
FIG. 1 is a block diagram of an embodiment of a system with a dynamically programmable AFE on a host, where the AFE is adjusted based on a determined operating condition of the AFE relative to sensor input.

Descriptions of certain details and implementations follow, including a description of the figures, which may depict some or all of the embodiments described below, as well as discussing other potential embodiments or implementations of the inventive concepts presented herein.

DETAILED DESCRIPTION

As described herein, a system controls the operating configuration of a dynamically programmable analog frontend (AFE) interface based on a determined operating state. The AFE includes hardware to interface with multiple different sensors, and analog processing hardware that can select input data from one or more of the multiple sensors. The analog processing hardware is coupled to a preprocessor that computes features from the input sensor data (e.g., raw sensor data), the features representing selected operating condition information of the AFE for the sensor. The preprocessor determines which one of multiple discrete operating states the AFE is in based on the sensor input data. The preprocessor can make the determination based on the computed features and a classification engine. The preprocessor can dynamically adjust the configuration of the AFE to adjust how it interfaces with the sensor based on the determined operating state.

In one embodiment, the AFE interfaces sensors to a sensor hub and/or a microcontroller, application processor, or other processor. The AFE receives raw sensor data, which refers to data that is unprocessed. The AFE can control any of a number of configuration dimensions for the interfacing, including, but not limited to, controlling amplification, bandwidth, sampling rate, resolution, number and type of amplifiers used, and/or other parameters based on the configuration of the AFE. AFE control can control settings of the AFE to affect any one or more of the configuration dimensions. Each can be controlled to be on or off, and/or set to one of multiple different settings.

In one embodiment, the preprocessor includes one or more filters, and/or applies filters through configuration settings to discard or ignore signals or portions of signals that are not of interest to the primary processor or the application processor. Thus, the preprocessor can generate features and classification of input signals that enables it to reduce the workload of the primary processor. In one embodiment, the AFE controller or control logic in the preprocessor can continuously update the AFE configuration to improve or optimize the quality of the sensor data while also minimizing redundant samples for sampling efficiency. It will be understood that expressions such as "optimize" and "minimize" are relative terms, and do not necessarily mean an absolute optimum or maximum or minimum is achieved. Rather, optimize and minimize refer to achieving a level that is a best fit for the current conditions based on the recent history of the sensor inputs, including the configuration and operation of the system, and the amount of processing power available within given time constraints. Thus, optimum or minimum can be constrained within tolerances built into the system architecture.

The AFE control can provide one or more control signals to cause the AFE to select one of multiple connected sensors at a time. In one embodiment, the control provided by the AFE control is digital signaling to the components of the AFE that set configuration of each component. For each sensor, the AFE control can configure the AFE in accordance with the operating conditions for the specific sensor. Such configuration for each sensor can be learned offline, and the AFE control configured to apply appropriate settings or different operating conditions. The AFE control can then compute features that indicate information about the operating conditions of the AFE while interfacing with the selected sensor. Based on the information computed, the AFE control can determine an operating state and configure the AFE interface for the specific operating state for the sensor. Thus, the preprocessor or AFE control can be considered to be context-aware that controls and tunes the reconfigurable AFE for lower power consumption. In one embodiment, the AFE control can selectively shut down the input from one or more sensors, for example, a sensor that provides redundant information in a given operating state. The AFE control can continue to ignore sensor data from the sensor until it detects another operating condition that suggests the data from the sensor may be information useful to the primary processor. Alternatively to shutting a sensor input down completely, the AFE control can simply reduce the frequency of sampling the sensor. Other variations are possible.

In one embodiment, the sensors indicate a user state or an environmental condition. The preprocessor can selectively sample and amplify sensor signals based on real time classification of the sensor or the user state or environmental condition indicated by the sensor. In one embodiment, the AFE control tunes sampling rate and/or accuracy (resolution) of the AFE based on the determined user state or operating state to save power. By controlling the sampling rate or frequency, amplification factor, and power supply to the AFE, the net on-time and power needed by the device is reduced. In one embodiment, the features computed or determined by the AFE control are computationally inexpensive statistical features extracted from the realtime input data. In one embodiment, such features can include, but are not limited to signal mean, power, and standard deviation. In one embodiment, the AFE control classifies the current operating state of the sensor based on predetermined parameters. For example, the AFE control can be trained or otherwise preprogrammed to interpret the input data as indicating certain operating conditions.

In one embodiment, the selection of significant statistical features to extract from the raw sensor data for feature or parameter determination and/or accurate classification is performed offline using machine learning techniques. The AFE control can include one or more computation engines to perform realtime feature extraction and/or classification. In one embodiment, the computation engines can be hardware engines, while parameters controlling the determination can be programmable and tunable. In one embodiment, such parameters can be dynamically changed at any time. Such parameters can be set by machine learning techniques, which can be online and/or offline machine learning.

FIG. 1 is a block diagram of an embodiment of a system with a dynamically programmable AFE on a host, where the AFE is adjusted based on a determined operating condition of the AFE relative to sensor input. System 100 can be one example of a system in which sensors generate input that is used by a computing core, represented by host 120. Host 120 performs certain operations in response to the sensor inputs. In one embodiment, host 120 can interface with a human user in response to the sensor inputs. In one embodiment, host 120 is a system on a chip (SoC). In one embodiment, host 120 is a processor or central processing unit. It will be understood that an SoC includes a processor or processing unit as well as other components. An SoC can be a single chip with multiple elements integrated together, or can be a single package with multiple chips assembled together (more commonly referred to as a multichip package (MCP)).

Whether with as an SoC, or a processor, host 120 is a computing core for a computing device, which can be a wearable device, sensor feedback unit, or other system that takes sensor input. In one embodiment, host 120 is part of a package that enables an Internet of Things (IoT), where devices can be networked and interconnected. Host 120 includes processor 124, which can be a CPU (central processing unit) or other primary processor. In one embodiment, processor 124 is one or multiple cores of a multicore device. In one embodiment, processor 124 is an application-specific processor. In one embodiment, processor 124 is a general-purpose processor. Processor 124 executes the host operating system for host 120, and generally includes the hardware control logic to control the overall operation of host 120. Processor 124 can also execute software control logic to control the overall operation of host 120. Processor 124 can be directly coupled to AFE 122, or coupled to AFE 122 via a sensor hub or comparable circuit. Processor 124 executes operations based on data gathered from sensors 110, and can thus be said to be the component that uses the sensor data.

In one embodiment, host 120 includes memory 126, which represents memory storage resources local to host 120. Local memory resources refer to memory resources that are directly addressable by processor 124, and can refer to cache memory and/or main memory resources. In one embodiment, memory 126 can be integrated directly onto the same integrated circuit or within the same package as processor 124 (e.g., on-chip cache). In one embodiment, memory 126 is outside a physical package that includes processor 124. In one embodiment, memory 126 includes volatile memory resources. In one embodiment, memory 126 includes nonvolatile memory resources. Nonvolatile memory is memory that maintains state even if power is interrupted to the memory. Volatile memory is memory whose state is indeterminate if power is interrupted to the memory. Memory 126 generally stores data and code to support the execution of operations of processor 124.

Host 120 includes AFE 122, which is a frontend circuit in accordance with any embodiment described herein. AFE 122 interfaces host 120 to sensors 110. In one embodiment, AFE 122 is a discrete circuit (e.g., with a separate substrate and/or PCB (printed circuit board) from processor 124). In one embodiment, AFE 122 can be implemented as a combination of integrated and discrete components (e.g., integrating a preprocessor and implementing other elements as discrete components). Thus, AFE 122 can be implemented as an integrated component design and/or assembled from off-the-shelf or specialized discrete components.

AFE 122 can include voltage mode and/or current mode inputs. Voltage mode sensor inputs provide a variable or analog voltage to represent sensor data. Current mode sensor inputs provide a variable or analog current to represent sensor data. In one embodiment, AFE 122 multiplexes inputs from sensors 110 to reduce the amount of analog circuitry needed to implement the frontend. AFE 122 is dynamically configurable, which allows the frontend circuit to adjust its operation and sampling of analog inputs to improve efficiency of operation. AFE 122 includes a preprocessor (not specifically shown) to generate feedback to analog input elements (not specifically shown) to dynamically adjust their operation. Thus, AFE 122 can change operation at runtime to improve the efficiency of the interface with sensors 110.

Sensors 110 provide data to host 120. The data can include one or more of environmental data (motion, temperature, ambient light, or other data), biometric data (heart rate, pulse, skin metrics, fingerprint, optical scan information, or other biometric information), or other data detected about a condition and/or a user. Sensors 110 include at least one component that generates an analog output. In one embodiment, one or more of sensors 110 includes analog interface circuitry within the sensor package. The level of processing provided by such a local analog interface circuit can be minimal or can be more significant (e.g., providing a digital output). Examples of sensors 110 can include accelerometers, motion sensors, gyroscopes, temperature sensors, location sensors, light detectors, sound/noise detectors, or other sensors.

It will be understood that not all sensors 110 operate on the same timing cycle. Each sensor 110 can have a different frequency of operation, and/or a different cycle in which it provides data to host 120 (and cycle in which host 120 should read the data). Typically, the operating frequencies of the components of host 120 operate on much higher frequencies than that of the sensors (e.g., sensors may operate at frequencies of less than 1 kHz, while the components of host 120 operate in the range of MHz for the processors and tens to hundreds of kHz for some sampling components).

System 100 consolidates analog frontend circuitry with AFE circuit 122. In one embodiment, AFE 122 is a standalone component or sensor hub that consolidates sensor input from sensors 110 to provide to processor 124. In one embodiment, AFE 122 couples to a sensor hub (not specifically shown) that can operate in parallel with AFE 122. In one embodiment, AFE 122 is part of processor 124 or a circuit or component of an SoC or multichip package. AFE 122 allows multiple sensors 110 to be operated with minimal or possibly no analog frontend within the sensor packages themselves. In one embodiment, an analog frontend on a sensor 110 can be bypassed to interface with AFE 122. A bare or minimal frontend on sensors 110 may still require some analog interfacing, such as capacitive circuitry and/or an amplifier to prevent parasitics from overwhelming the output signal. In one embodiment, AFE 122 receives unprocessed analog signals from sensors 110. Unprocessed can refer to any analog output that is an analog signal from a sensor with a bare or minimal frontend. Thus, unprocessed signals can still include signals that are amplified and/or capacitively filtered to prevent parasitics from overwhelming the signals. Unprocessed refers to signals provided where AFE 122 can control the sampling, digitization, and processing of the signal.

AFE 122 includes processing components that convert the analog signals from sensor 110 into digital signals. In one embodiment, AFE 122 includes processing logic (e.g., a preprocessor) that performs operations on the digital signal data prior to sending the data to main processor 124. The processing logic can include AFE control logic that configures the AFE operation based on input from sensors 110. In one embodiment, the processing logic and AFE control logic can be part of processor 124, and perform operations on the signals prior to providing the data to an application specific processor application specific thread, or application specific core.

The AFE control logic selects among the sensors inputs and extracts or computes features from the selected sensor input. There can be a few features, or as many as dozens or more than one hundred different features that could be computed from the sensor input data. The features can include any type of feature directly detectable from the data (e.g., measured data) and/or indirectly determinable from the data (e.g., computed data). In one embodiment, the AFE control logic selects from a subset of total features, which subset can be significantly fewer than the total number of features that could be extracted. Based on a selected number of features, the AFE control logic determines an operating state of the AFE and sets a configuration of the AFE.

In one embodiment, the AFE control logic stores one or more of the features. The AFE control logic can determine an operating state based on the stored features. In one embodiment, the AFE control logic classifies the features, which classification can be used to determine the operating state. The AFE control logic can control the AFE operation based on the determined operating state. Controlling the operation of AFE 122 can include setting parameters for sampling or other aspects of interfacing with the sensors. The setting of the parameters can be for the specific selected sensor (e.g., set a configuration to use the next time the specific sensor is selected to be sampled). The setting of the parameters can additionally or alternatively be for a different sensor, such as a sensor that provides complementary or redundant data to the selected sensor.

Figure 2:
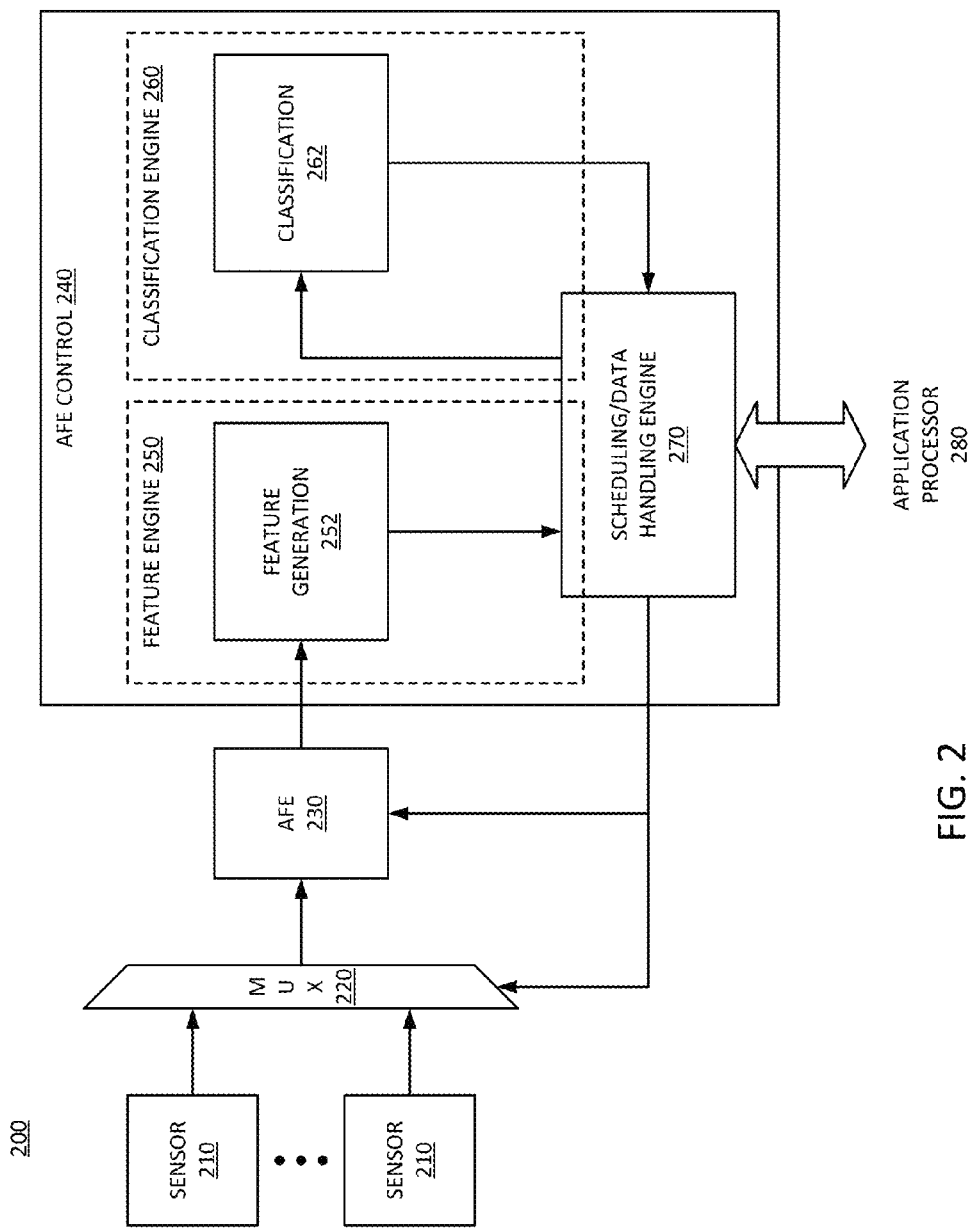
FIG. 2 is a block diagram of an embodiment of a system with a dynamically programmable AFE circuit that is adjusted based on feature calculation and/or classification of input features.

FIG. 2 is a block diagram of an embodiment of a system with a dynamically programmable AFE circuit that is adjusted based on feature calculation and/or classification of input features. System 200 can be one example of a system in which sensors generate input that is used by a computing core, and can be an example of a system in accordance with system 100 of FIG. 1. System 200 includes multiple sensors 210, which generate analog data to be used by application processor 280. In one embodiment, system 200 includes one or more multiplexers (muxes) 220 to select from among sensors 210. In one embodiment, multiplexer 220 includes voltage mode inputs for voltage mode sensors. In one embodiment, multiplexer 220 includes current mode inputs for current mode sensors. The number of sensors can be scaled to any number, potentially including dozens of sensors.

Multiplexer 220 selects one of sensors 210. Mux 220 passes the signal from the selected sensor to AFE 230. AFE 230 includes components for signal amplification and digital conversion, such as an amplifier, filter (e.g., a low-pass antialiasing filter), and analog-to-digital converter (ADC). In one embodiment, AFE 230 oversamples the signal (e.g., a digital low pass filter operation) to reduce noise before sending the data for extracting statistical features. System 200 includes AFE control 240, which represents logic that controls the AFE in accordance with any embodiment described herein. AFE control 240 receives data from AFE 230, extracts features from the data, and determines how to control the dynamic programmability of the AFE based on an operating state determined by the AFE control.

In one embodiment, AFE control 240 includes feature engine 250 to generate or extract features from the input sensor data. In one embodiment, AFE control 240 includes classification engine 260 to classify features from the input sensor data. AFE control 240 includes scheduling/data handling engine 270 to schedule sensor input from sensors 210, control mux 220 to select the sensors in accordance with the schedule, and generate control signals to control the settings of AFE 230. In one embodiment, some of the operation of engine 270 could be considered part of feature engine 250. In one embodiment, some of the operation of engine 270 could be considered part of classification engine 260. Each engine, 250, 260, 270, is executed by hardware processing resources. The hardware can be configured for operation by firmware and/or other code to execute the operations associated with each engine. The hardware can be the same hardware that executes all three engines, or could be separate hardware for one or more of the engines.

Feature engine 250 is illustrated with feature generation block 252, which represents the logic (e.g., hardware logic, or a hardware processor configured with software logic) to extract or determine features from the input sensor data. In one embodiment, feature generation generates features based on a programmable window size and overlap between the windows. An example of such an implementation is provided in FIG. 5. Feature generation 252 can collect data from the selected sensor prior to performing calculations, and then operate on one or more windows of data samples. In one embodiment, feature generation 252 stores enough data to fill a window size and generates the features from the window of data. Similar to what is mentioned above, any number of features can be generated/extracted from the data. Typically there will be more features than can reasonably be extracted in a realtime setting. Thus, feature generation 252 can select key features and generate only those determined most useful for the particular sensors. The key features for each sensor can be determined by administrator configuration and/or machine learning. Feature generation 252 can store the features in engine 270. Feature generation 252 can store collected data or samples in a cache in AFE control 240.

In one embodiment, feature generation 252 extracts features depending on the accuracy of the classification needed or the accuracy needed for determining the operating state. Feature generation 252 can also generate features based on the types of sensors 210 that interface with AFE 230. In one embodiment, determination of operating states can be a simple activity/non-activity detection (or similarly a binary determination of whether or not the input is interesting or not interesting to the application processor). In such a case, feature generation 252 can generate the three features mean, standard deviation, and power. Based on these features AFE control 240 can accurately classify or determine operating state for the detection. Such a simple implementation provides a simpler and more power efficient architecture. In one embodiment, other implementations utilize more complex context processing using features such as FFT (Fast Fourier Transform) or Wavelet transforms, and/or others. Generating and using such features may cost more power. Feature generation 252 can generate whatever features are needed for the specific implementation to provide an accurate determination of operating state.

Feature generation 252 can generate features with computationally inexpensive and reusable calculation logic blocks. Thus, the same blocks of logic elements can be used to compute different features. In one embodiment, feature generation 252 implements a variable window size to collect data, and computes features from different windows. In one embodiment, feature generation 252 implements window-to-window overlap with minimum memory requirements by reusing memory resources after performing computations with the reusable logic blocks.

In one embodiment, classification engine 260 classifies data received from the sensors, which can be based on the features generated and stored by feature engine 250. In one embodiment, feature engine 250 generates more features than classification engine 260 will use. In one embodiment, classification is based on one or more features. Classification engine 260 is illustrated as having classification block 262, which performs computations related to classifying features of the sensor data. It will be understood that the operations of classification engine 260 are not necessarily tied to the timing of the operations of feature engine 250. Thus, for example, feature engine 250 can generate the same feature from multiple different sensors 210 and store the features in engine 270. Classification 262 can then perform classification on the same feature determined from one sensor or from multiple different sensors. Classification 262 can also perform classification based on multiple features from one or multiple sensors. In one embodiment, classification 262 can perform an analysis with different features from different sensors. Thus, classification 262 performs an analysis of features from only one sensor or with the combination of features from multiple sensors.

Figure 4:
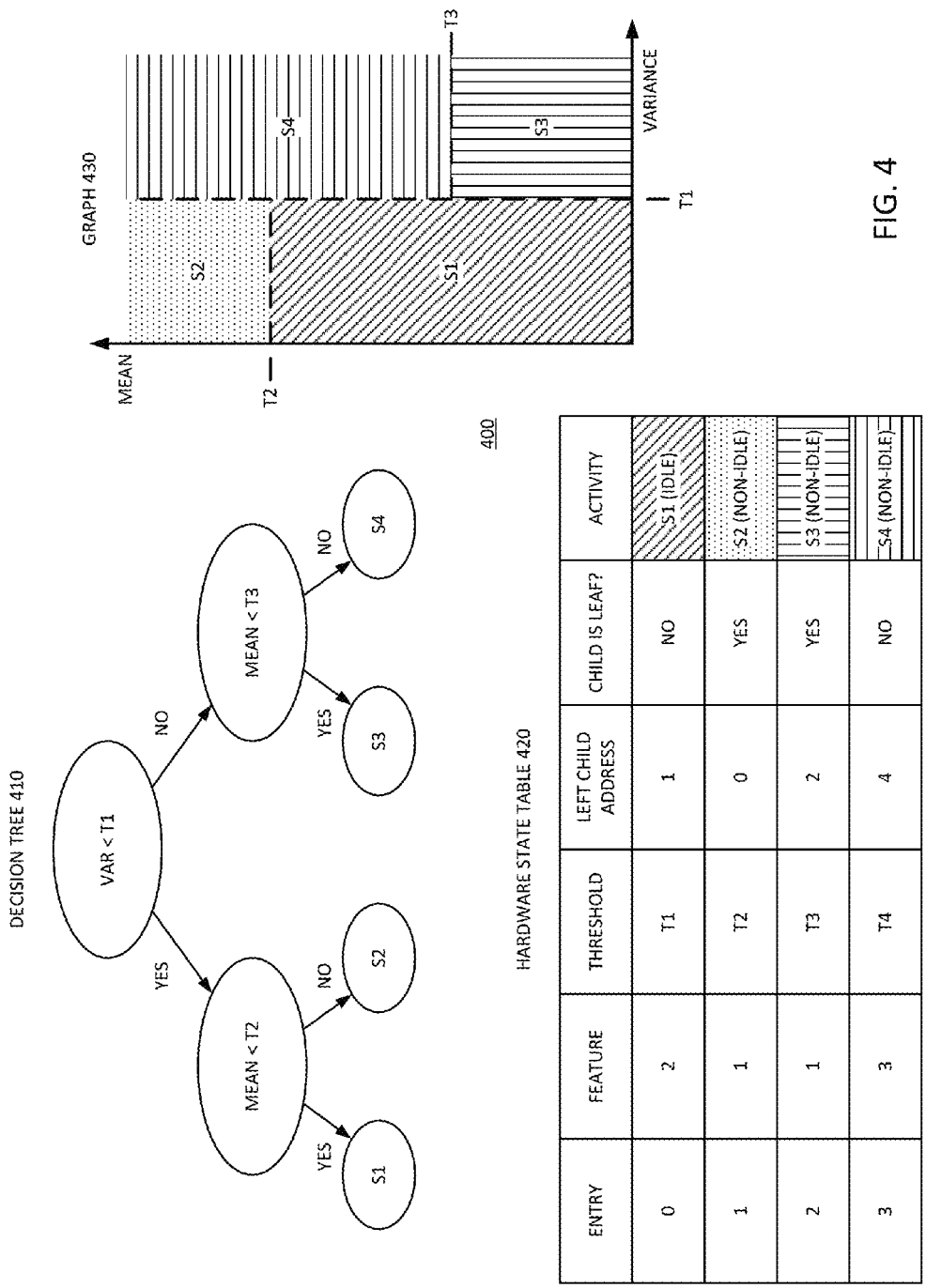
FIG. 4 is a representation of an embodiment of operation of an AFE control system.

In one embodiment, classification can be the mechanism for determining operating state. In one embodiment, a simple lookup determination can identify operating state based on features calculated. In one embodiment, classification can be considered to include such a simple lookup determination. In one embodiment, classification 262 performs classification with a binary decision trees. One example as illustrated in FIG. 4, allows for four different states. However, it will be understood that AFE control 240 is scalable to allow for a larger number of states.

In one embodiment, classification 262 includes multiple different classification trees. By employing multiple different classification trees, classification 262 can improve the accuracy and the modularity of the decision-making. In an implementation where different classification trees are used, the different trees can have different arbitrary depths (which would be constrained by memory usage) for classification. Classification engine 260 can be trained offline to determine what parameters or features to use, and how the trees can be configured. In a binary decision tree, each leaf can hold an activity state label and correspond to a different set of input conditions. In one embodiment, the decision tree can be navigated by feature thresholds, allowing classification 262 to work down each branch based on feature values compared to feature thresholds. The thresholds can be determined offline by testing a variety of splitting criteria and input combinations to minimize the generalization error. It will be understood that improved prediction accuracy will result in greater power saving, since AFE control 240 can reduce the sampling rate and/or other parameters of AFE 230 when less precise sensor data can be used. In one embodiment, feature generation 252 generates, and classification 262 bases classification on, time-domain features. The use of time-domain features only can result in a simpler and more memory efficient design. In one embodiment, feature generation 252 generates, and classification 262 bases classification on, features related to frequency domain techniques.

In one embodiment, classification engine 260 includes multiple different classification trees, which can have different levels of complexity. It will be understood that sue of the simplest tree possible can result in the most power-efficient operation. However, edge cases might not be accurately classified with trees of lower complexity. In one embodiment, classification 262 can tree hop, referring to hopping from one classification tree to another. The trigger to hop a tree can be set based on specific input features, idle time, or can be set manually via application processor 280. Thus, when AFE control 240 detects certain feature cases, it might anticipate many edge cases, and cause classification engine 260 to use a more complex classification tree. Additionally or alternatively, application processor 280 can signal the anticipation of special cases that can be more accurately classified with tree hopping to more complex decision trees. Thus, in one embodiment, classification 262 represents a simplest classification tree available as a default case, and can be change to a more complex decision algorithm based on detected inputs, and/or based on signaling from application processor 280. The use of tree hopping can additional benefit system 200 by monitoring the amount of time spent in an idle state, and can prevent the system from getting stuck in a specific state. In one embodiment, classification engine 260 includes one or more timers and determines if the same operating state is classified continually for a threshold amount of time. If the threshold time is reached, classification 262 can hop to a different tree (e.g., a more complex tree) to verify that the current operating state is accurate, instead of simply stuck due to failing to detect an edge case.

Engine 270 can use classification results to determine the sampling rate of sensors 210 and/or other settings for a specific configuration of AFE 230. Engine 270 can generate control signals or other signals to set the configuration of AFE 230. Thus, AFE control 240 can control the configuration and operation of AFE 230 dynamically, in realtime, based on sensor input. It will be understood that realtime operation refers to continuously monitoring and continuously dynamic operation responsive to inputs as they are generated. Realtime implies that there is little to no delay in the response to the input.

In one embodiment, engine 270 uses one or more tables loaded during configuration by application processor 280. The tables can be loaded once at startup, or dynamically based on evaluation by application processor 280. Engine 270 can schedule sensor sampling based on the one or more tables. In one embodiment, the tables can be implemented as a register file, holding configuration information for all components of AFE 230 for each classification. Thus, in one embodiment, engine 270 can schedule based on a lookup table (LUT) mechanism. Engine 270 can configure AFE 230 on a per-sensor and per-classification basis. In one embodiment, an ADC in AFE 230 can be triggered solely based on a schedule table, and when scheduling conflicts arise (e.g., having multiple different states for each of multiple sensors 210 prevents prescheduling the sample of AFE 230), AFE 230 can queue inputs to be executed in order when the AFE is not busy. Such scheduling allows for interrupt free operation with minimum delay between the scheduled sampling time to actual sampling time.

Engine 270 can include controls for any of a number of different parameters of AFE 230, enabling AFE control 240 to dynamically adjust operation of AFE 230 in any of a number of ways. Examples of control include, but are not limited to, controlling sampling rate, enabling and disabling entire circuits or logic blocks within AFE 230, controlling sampling resolution of an ADC, controlling bandwidth, controlling gain, switching between a high-power and a lower-power component (e.g., an amplifier), switching between a high-precision a lower-precision component (e.g., an amplifier), turning choppers on or off for low-frequency noise improvement, or other controls, or a combination.

In one embodiment, classification engine 260 triggers operation of classification 262 each time feature generation 252 stores features in engine 270. Thus, each time features are refreshed, classification 262 can refresh classification. Refreshing the classification can refresh the state of AFE 230. In one embodiment, classification 262 determines an operating state for the entirety of system 200, rather just an operating state for a single sensor. To determine an operating state for system 200, it will be understood that classification 262 will use input from multiple sensors 210.

As one simple example, provided as an illustration and not limiting in any way, consider that system 200 is incorporated in a wearable activity sensing device. A human user of the activity sensing device will alternate throughout the day in being more and les active. In such an implementation, heartbeat alone may indicate exercise, assuming the device intends to track exercise activity. However, heartbeat data and/or other biometric sensor data in combination with accelerometer data could be determined to indicate exercise. In response to features generated from a heartbeat sensor and an accelerometer could cause system 200 to determine an operating state of active exercise. In response to determining that active exercise has begun, engine 270 can increase sampling rate and ADC accuracy of the heartbeat sensor (e.g., ECG) based on the determined operating state. It will be understood that the possible examples are far too numerous to list or suggest here.

In one embodiment, engine 270 stores the current activity states of all sensors 210. In one embodiment, engine 270 selectively sends current activity state information and/or sensor data to application processor 280. Application processor 280 represents a primary processor for a computing device in which system 200 is incorporated. A processor can be referred to as an application processor when the processor includes configuration or programming and a dedicated block of time for computation for a specific application. Thus, application processor 280 can be considered the consumer of the sensor input data, and performs operations based on the data.

In one embodiment, engine 270 includes a decongestion algorithm for scheduling, which can be implemented for cases where conflict is anticipated. For example, when scheduling when to sample sensors 210, engine 270 can write the next time to sample at the time of execution rather than the ideal time of execution. Thus, engine 270 can avoid conflicts in the next round of sampling by naturally placing appropriate temporal offset(s). In one embodiment, engine 270 can turn on and turn off, or simply schedule and not schedule sampling, certain sensors 210. In such a case, engine 270 can include configuration information for turn-on and settling times for sensors 210. In a case that actual sensors are disabled, engine 270 can send control signals to individual sensors to improve overall system power usage in system 200.

Figure 3:
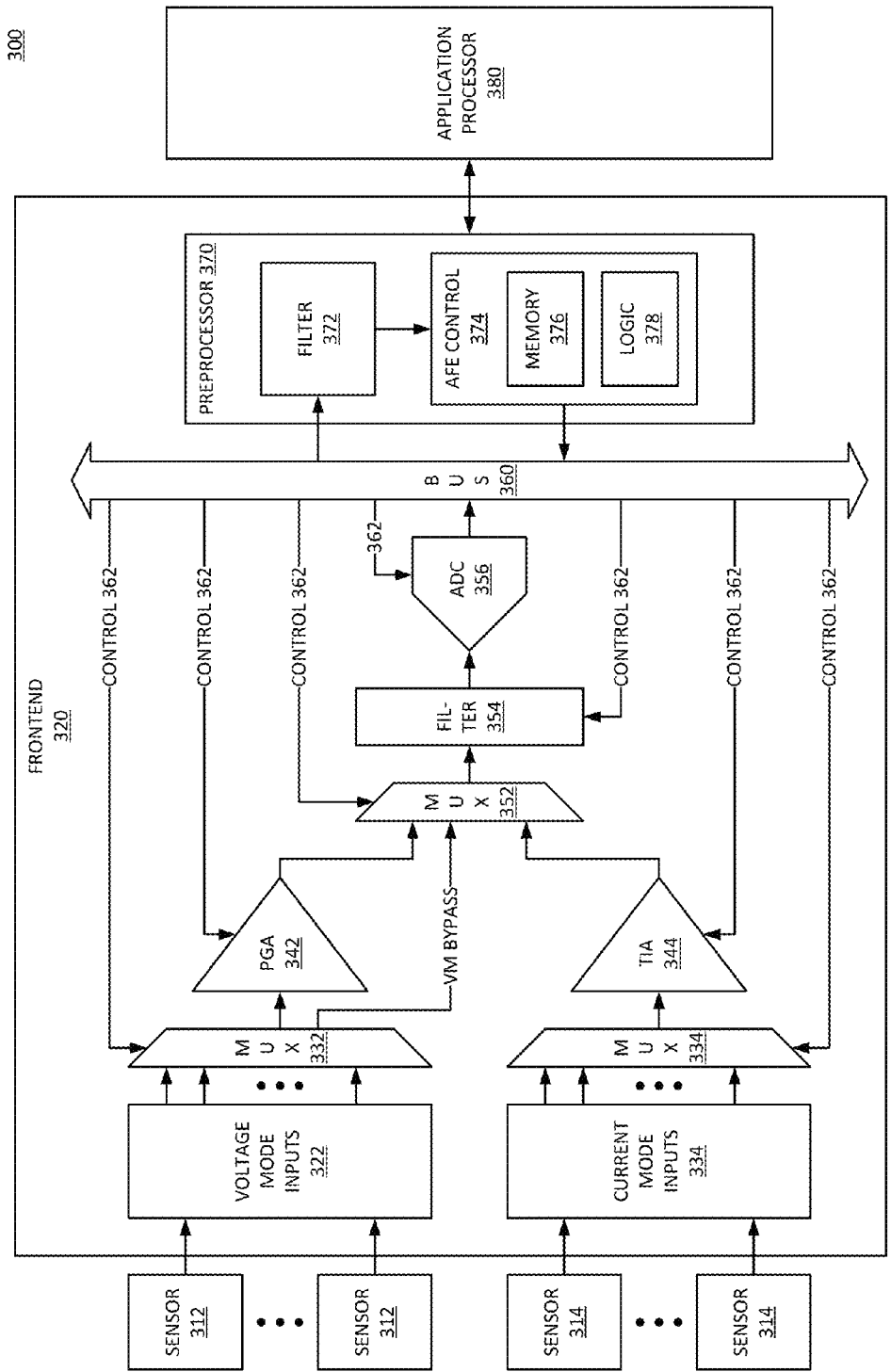
FIG. 3 is a block diagram of an embodiment of a system with a multiplexed dynamically programmable analog frontend circuit.

FIG. 3 is a block diagram of an embodiment of a system with a multiplexed dynamically programmable analog frontend circuit. System 300 can be one example of a system in accordance with system 100 of FIG. 1 or a system in accordance with system 200 of FIG. 2. System 300 includes frontend 320, which can be an example of an AFE. In system 200, the multiplexer was illustrated as being outside the AFE, whereas frontend 320 includes multiplexed analog inputs. Frontend 320 is coupled to associated processor 380, which ultimately uses data from the analog inputs to control operation of a computing device. Processor 380 can be a primary processor or host processor for the computing device, or a peripheral processor that executes in parallel with a primary processor. The processing elements within frontend 320 can be examples of processing components of an AFE in accordance with any embodiment described herein.

In one embodiment, system 300 includes one or more sensors 312, which generate voltage mode analog outputs. In one embodiment, system 300 includes one or more sensors 314, which generate current mode analog outputs. Voltage mode inputs can be single-ended or differential. Frontend 320 receives inputs from voltage mode sensors 312 at voltage mode input circuitry 322. Frontend 320 receives inputs from current mode sensors 314 at current mode input circuitry 324. Inputs 322 and 324 represent pins or connectors and signal lines to receive the sensor signals. In one embodiment, frontend 320 is a multiplexed AFE, where multiple sensors share the same analog circuitry (e.g., analog amplifiers and data converters), which can save area and power. Thus, inputs 322 and 324 provide the analog inputs to respective multiplexers 332 (voltage mode) and 334 (current mode).

In one embodiment, multiplexer 332 can select a specific analog input from sensors 312 for amplification by amplifier 342. In one embodiment, amplifier 342 is a programmable gain amplifier (PGA), which can be used to increase the magnitude of an incoming voltage signal. In one embodiment, current mode multiplexer 334 can select a specific analog input from sensors 314 for amplification by amplifier 344. In one embodiment, amplifier 344 is a transimpedance amplifier (TIA), which provides a variable voltage output based on the magnitude of the incoming current. Thus, both amplifiers 342 and 344 can generate an output voltage.

Amplifiers 342 and 344 provide their voltage outputs to one or more analog to digital converters (ADCs) 356. In one embodiment, frontend 320 includes multiplexer 352 or other selection logic to route output signals from the amplifiers to the one or more ADCs. In one embodiment, frontend 320 includes filter 354 to provide a filter stage prior to the ADC. Filter 354 could include a low-pass anti-aliasing filter and/or other more complex filter components. In one embodiment, filter 354 includes adjustable behavior that can be tuned or adjusted in response to analysis by preprocessor 370. Filter 354 can be adjustable based on the type of input that ADC 356 will sample. ADC 356 represents an analog to digital conversion stage, which can include multiple different devices. It will also be understood that voltage mode inputs 322 and/or current mode inputs 324 could be subdivided into multiple different devices, as can multiplexers 332 and/or 334. ADC 356 converts an analog signal into a digital representation. The amplified signal converted by ADC 356 is a discrete sample of what is typically a continuous output by the sensors. Thus, ADC 356 can be said to create a digital representation of a sample, or to generate a digital sample.

In one embodiment, ADC 356 passes digital output(s) to preprocessor 370 via bus 360. In one embodiment, preprocessor 370 includes multiple digital signal processing (DSP) blocks. In one embodiment, preprocessor 370 is or includes multiple DSP units that are tailored for common sensor types as well as including dynamically programmable DSP units that can be customized to interface with other (e.g., future) sensor types. Bus 360 represents any one or more groups of signal lines that interface with multiple different circuit components. Bus 360 is typically routed on a substrate on which frontend 320 is processed to various components disposed on (or in) the substrate. In one embodiment, preprocessor 370 can perform an initial analysis to determine the quality of the sensor data sample, and/or determine whether a noteworthy event has occurred or is occurring (e.g., whether the data indicates something that would require processor 380 to execute an operation). Thus, the preprocessing can enable processor 380 (or sensor hubs, microcontrollers, microprocessors, DSPs, or other processing components) to sleep until relevant sensor data is received.

In one embodiment, preprocessor 370 includes a collection of hard-wired algorithms and/or programmable units that assess the quality and utility of incoming data. In one embodiment, preprocessor 370 is a mixed processing block that is part of processor 380, but with a separate power supply. Processor 380 can be an application specific processor. Based on the initial processing or the preprocessing, preprocessor 370 provides feedback to the analog components of fronted 320. Thus, preprocessor 370 provides dynamic runtime control of the analog components which can improve the efficiency of operation of the components. As illustrated in system 300, control signals 362 feed back from bus 360 to the analog components. In one embodiment, preprocessor 370 can generate control signals 362 for one or more of the multiplexers (332, 334, 352), the amplifiers (342, 344), and/or ADC 354. Control signals 362 can adjust sampling rates, bandwidths, gains, or other operational parameters of the analog components as mentioned above.

Preprocessor 370 is illustrated to include filter 372 and AFE control 374. Filter 372 represents functionality in preprocessor 370 that enables preprocessing the digital samples of the inputs. Filter 372 can include any one or more processing capabilities, such as but not limited to digital filtering, de-noising, a discrete Fourier transform (DFT) filter, detecting peaks in an incoming signal such as frequency pulses or signal strength peaks, or others. AFE control 374 represents functionality in preprocessor 370 to generate feedback or control signals to control the sampling operation of the analog components.

AFE control 374 can generate feedback control signals to control the sampling and interfacing operation of frontend 320 with the sensors. AFE control 374 can generate any one or more of the following control signals. In one embodiment, AFE control 374 enables preprocessor 370 to generate an amplifier gain control signal. The amplifier gain can adjust the gain up for a signal with a swing that does not utilize the full swing of the amplifier or amplitude range of the ADC. Conversely, for a signal that runs into the rails, the gain control signal can adjust the gain down. In one embodiment, AFE control 374 enables preprocessor 370 to generate an amplifier bandwidth control signal. The amplifier bandwidth control signal can adjust operation of the tradeoff between bandwidth and gain of amplifier 342 and/or 344. In one embodiment, AFE control 374 enables preprocessor 370 to generate control signals to select specific inputs from multiplexers 332, 334, and/or 352. In one embodiment, AFE control 374 enables preprocessor 370 to generate a control signal to adjust the filtering of filter 354, such as by adjusting operation based on the type of input to be sampled. In one embodiment, AFE control 374 enables preprocessor 370 to generate a control signal to adjust a sampling rate of ADC 356 and/or to adjust a number of bits of resolution of the output signal generated by ADC 356 (e.g., only output 8 bits of resolution when the ADC is capable of generating 12 bits of resolution). In one embodiment, AFE control 374 enables preprocessor 370 to generate a control signal to cause an analog component to sleep or enter a low power state. In one embodiment, AFE control 374 enables preprocessor 370 to generate a control signal to cause an analog component to wake from a low power state, such as waking on a specific condition (e.g., a specific input, an input greater than or less than a threshold, a change in an input, or other condition). In one embodiment, control 374 enables preprocessor 370 to generate a control signal to control the number of amplification stages frontend 320 will use. For example, amplifiers 342 and/or 344 can be multistage amplifiers, where control signal(s) 362 can switch the operation of either or both amplifiers from a single stage amplifier to a multistage amplifier. It will be understood that the examples described are merely illustrative, and AFE control 374 can generate selected ones of the examples, and/or control signals not specifically described.

In one embodiment, AFE control 374 includes memory 376. In one embodiment, AFE control 374 includes logic 378, which enables AFE control 374 to generate features from input data from the sensors. Based on features generated by logic 378, AFE control 374 generates control signals 362 to control the operation of frontend 320 in accordance with any embodiment described herein. AFE control 374 generates the control signals in response to determining an operating state of frontend 320 by analyzing the features generated. Memory 376 represents a memory device local to the AFE controller. AFE control 374 stores generated features in memory 376 for use in analysis and determining the operating state of frontend 320.

In one embodiment, frontend 320 interfaces with signals that can be fed directly through, without the need for amplification. It will be understood that ADC 354 may not be able to convert a current mode signal into a digital output, and thus, it might not be possible to bypass TIA 344. However, for voltage mode signals, in one embodiment, one or more control signals 362 can control multiplexer 352 to bypass PGA 342 directly to multiplexer 352 (or to ADC 354, depending on system configuration). Preprocessor 370 can generate control signals 362 to control whether or not an input signal bypasses the amplifier.

In one embodiment, preprocessor 370 generates control signals 362 to cause the analog components of frontend 320 to use the minimum gain and minimum power necessary to provide a clear signal. In one embodiment, preprocessor 370 can filter and control the inputs based on sensor correlation. For example, consider two sensors that do not generate the exact same data, but whose data in a certain circumstance may be duplicative. In one embodiment, preprocessor 370 can filter and/or skip an input based on correlation of the data between sensors. Such logic can be built into preprocessor 370 and/or programmed into a programmable element of preprocessor 370.

While frontend 320 is illustrated with a single block for each described component, it will be understood that there can be multiples of one or more of the analog frontend components illustrated and described. Thus, there can be many sensors 310 coupled to multiple inputs 322 and/or 324. Multiple inputs can provide signal inputs to one or more multiplexers 332 and/or 334. One or more multiplexers 332 and/or 334 can provide inputs to one or more amplifiers 342 and/or 344. One or more amplifiers 342 and/or 344 can provide signals to one or more multiplexers 352, which can in turn provide signals to one or more filters 354. The one or more filters 354 can provide signals to one or more ADCs 356, which sample the inputs for preprocessor 370. Thus, there is not necessarily a one-to-one relationship of components within frontend 320, but there can be multiples of one component and one of another.

FIG. 4 is a representation of an embodiment of operation of an AFE control system. Diagram 400 includes three different representations of the logical operation of AFE control logic, in accordance with any embodiment described herein. For example, the illustrations of diagram 400 can be exemplary of those implemented by AFE control 370 of FIG. 3, or AFE control 240 of FIG. 2. For simplicity, diagram 400 assumes only features, and three different thresholds. However, the representations of diagram 400 could be expanded to allow significantly more features and thresholds. One test of a system employing a decision tree architecture for use in AFE control employed 7 features. The implementation will scale with more of fewer features.

Diagram 400 illustrates decision tree 410, which can be one example of a tree used for classification. Thus, decision tree 410 could also be referred to as an example of a classification tree. Decision tree 410 illustrates a determination of whether a computed variance is below threshold T1. If the variance is below T1, YES branch, the AFE control logic traversing decision tree 410 determines if the mean is below threshold T2. If the mean is below T2, YES branch, the AFE control logic traversing decision tree 410 determines that the operating state is state S1. If the mean is above T2, NO branch, the AFE control logic traversing decision tree 410 determines that the operating state is state S2. Returning to the variance determination, if the variance is higher than T1, NO branch, the AFE control logic traversing decision tree 410 determines if the mean is below threshold T3. If the mean is below T3, YES branch, the AFE control logic traversing decision tree 410 determines that the operating state is state S3. If the mean is above T3, NO branch, the AFE control logic traversing decision tree 410 determines that the operating state is state S4.

In one embodiment, the AFE control implements decision tree 410 as a register file. As a register file, the AFE control logic can store a relevant feature and one or more thresholds used to make the decision. The control logic can also store the next node to move to based on the previous decision, and the address of the node to move to. It will be observed that the architecture of decision tree 410 has a "left child" as the YES branch, and the "right child" as the NO branch. The left child refers to the child node represented graphically in diagram 400 as being to the below-left of the decision node, and the right child is the child node to the below-right of the decision node. Thus, Mean <T2 is the left child of Var <T1, S1 is the left child of Mean <T2, and S3 is the left child of Mean <T3. The other child nodes are right-child nodes. In one embodiment, such an architecture as illustrated in decision tree 410 can save memory in an actual implementation. For example, the AFE control logic can store only the left child address is stored, which is the destination if the feature is less than the threshold. If the feature is greater than the threshold, the AFE control logic can be configured to access a location one greater than the stored memory location of the left child.

It will be understood that decision tree 410 is not necessarily the only decision tree in the system associated with diagram 400 that can determine whether the system is in operating states S1, S2, S3, or S4. Similar to what is described above, the system could allow for tree hopping, to jump from decision tree 410 to another decision tree (not shown), which can include additional and/or different features. Another decision tree could also or alternatively include additional and/or different thresholds. Such an additional decision tree could be more complex than decision tree 410, and be useful in determining edge cases.

Hardware state table 420 can be one representation of a table for implementation of a decision tree, which may include decision tree 410. In one embodiment, table 420 is a lookup table (LUT) preloaded with state information. It will be observed that whereas decision tree 410 only includes two features (Variance and Mean), table 420 includes an entry for a third, non-specified feature and additional threshold T4. In one embodiment, a decision tree other than decision tree 410 includes dimensions for Feature 3 and threshold T4. In one embodiment, a scheduling and data handling block in the AFE control stores the features, which can then be classified based on predetermined thresholds learned for the system. The classification can determine an operating state, such as by traversing decision tree 410.

The thresholds allow the decision trees to select operating states based on whether feature values are within different dimensions of ranges of thresholds. Graph 430 illustrates a two-dimensional view of the operating states. The operating states exist in two dimensions because there are only two features used to determine the operating states. Graph 430 would be more complex (include extra dimensionality) if it illustrated the states with respect to an additional feature and an additional threshold. Diagram 400 illustrates that determination of an operating state from features computed from sensor data can be accomplished by reducing the dimensionality of the sensor data through generating statistical features and classifying the state of the sensor (or the entire system) based on the features.

Based on determining one of the operating states or activity states identified in table 420, the AFE control logic that performs in accordance with diagram 400 can adjust sampling rate and/or other properties of the AFE can to improve operation while minimizing power consumption. For example, there is no need to sample at a high sampling rate and with high accuracy when there is no information of importance to process (e.g., for an activity tracking device where the user is sitting, sleeping, or otherwise inactive). However, when the features extracted from the input sensor data indicate that an event of interest is occurring which should be sent to an application processor, the AFE control can increase sampling rate, accuracy, and/or other parameters to higher levels, where the higher levels will depend on the application. Classification can also be based on input from multiple sensors, leading to higher accuracy through fusing the sensor information. Alternatively power hungry sensors can be sampled less by fusing information to extract the same context, or inferences about context can be made which would otherwise not be possible.

The classification or selection of operating state can extend context for one or more sensors. For example, the system can extend context to more specific actions (e.g., walking, running, sitting) for inertial sensors, or extend context for air quality sensors to indoor versus outdoor or exposed to pollutants versus not exposed, to name a couple of very simple examples. Context in this case can refer to the number of operating states that are detectable in a system. In certain implementations, two levels of context (e.g., interesting/not interesting) can be sufficient. In other implementations, more levels of context (e.g., four levels or more) for each sensor can be provided.

Figure 5:
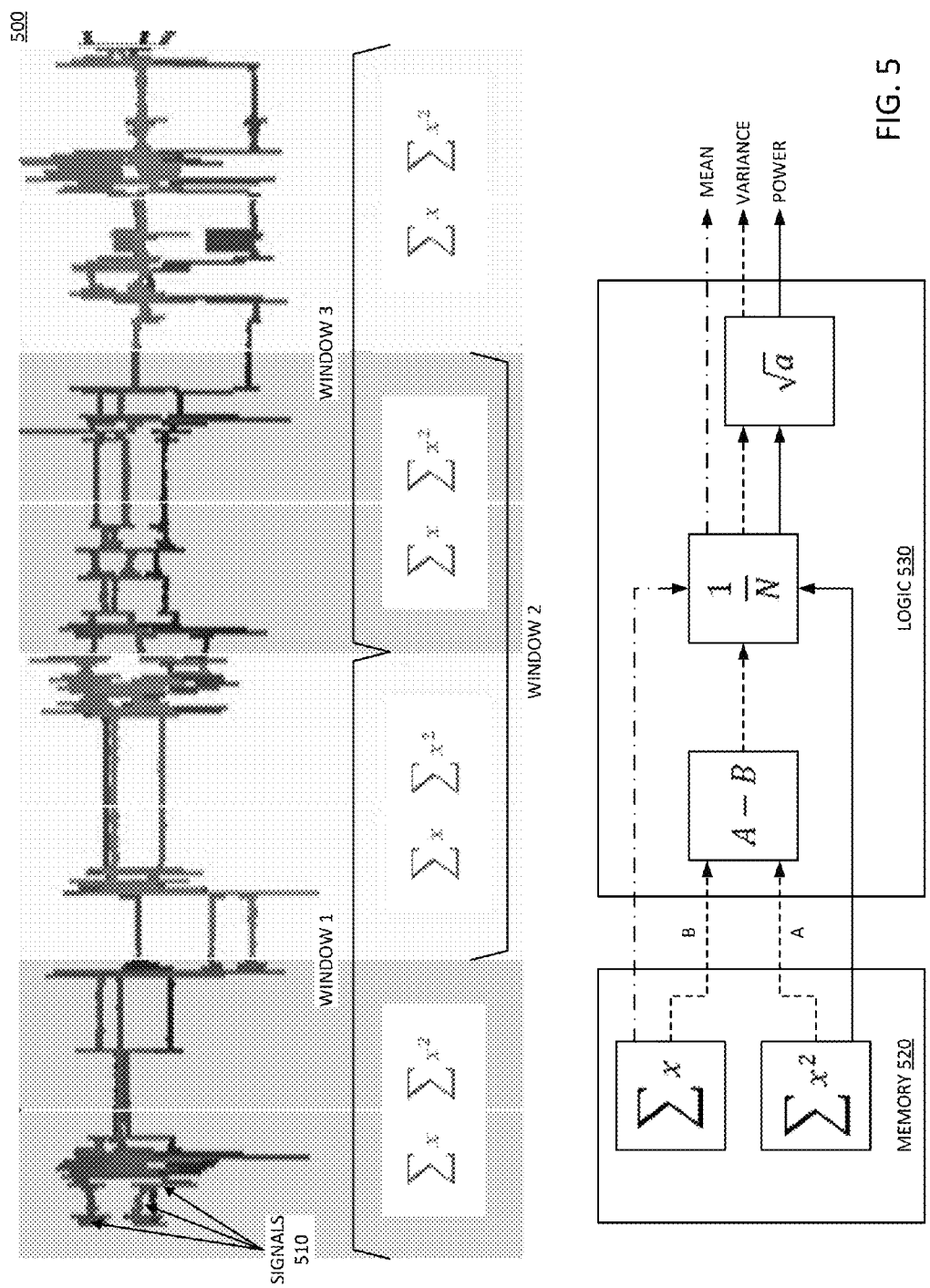
FIG. 5 is a representation of an embodiment of feature calculation in accordance with a graphical perspective and a logical perspective.

FIG. 5 is a representation of an embodiment of feature calculation in accordance with a graphical perspective and a logical perspective. System 500 illustrates feature calculation operations that can be performed by AFE control in accordance with any embodiment described herein. For example, feature engine 250 of FIG. 2 and/or AFE control logic 378 of FIG. 3 can implement calculations similar to those illustrated in system 500.

It will be understood that computing or otherwise extracting features can require memory resources. The data used to compute the features and/or the computed features themselves may need to be stored, at least temporarily. However, using significant amounts of memory can increase the size, cost, and power consumption of feature extraction. Typically, the amount of memory usage is a system constraint. System 500 illustrates feature determination that also manages the amount of memory used. Thus, system 500 is illustrated as keeping history, but a small amount of history. System 500 illustrates the use of specific features (namely, Mean, Variance, and Power) for purposes of illustration. However, it will be understood that any number of different features could be calculated from the input sensor data using the same techniques illustrated.

Signals 510 represent raw data from three different signals, as generated from simulation data. Signals 510 represent sensor input signals in the time domain. In the illustration of system 500, the specifics of what signal data refers to which different signal may not be detectable. However, the specifics of the signals are not necessarily significant, given that any number of different signals from different sensors will all look different. The significant point is that multiple sensor input signal data and data that varies over time can be analyzed for feature determination.

In one embodiment, AFE control uses a window size of data to determine features. Windows 1, 2, and 3 are of the same size, and measure the data at different points in time. In one embodiment, as illustrated, the feature determination can employ overlapping windows. It will be observed that Window 2 starts halfway through Window 1, and Window 3 starts halfway through Window 2 (in fact, Window 3 starts as soon as Window 1 concludes). In one embodiment, the windows can overlap more than what is shown. In one embodiment, the windows can overlap less than what is shown. In an implementation where the windows overlap more, there would be some period in time where Windows 1, 2, and 3 would be active at the same time. In an implementation wherein the windows overlap less, there would be some period of time where Window 1 has concluded and Window 2 has started, but Window 3 is not yet active or not yet started. Overlapping windows can prevent losing edge case data.

In each window, the feature generation engine computes a sum of the signal power ($\Sigma x$) as well as a sum of the square of signal power ($\Sigma x^2$). In one embodiment, the feature generation engine computes the sum over the entire window size. In one embodiment, the feature generation engine computes the sum over a subset of the window. Memory 520 stores the sum and squared sum calculated for a given window. After storing the window of data, logic 530 computes or extracts the features from the data.

The Mean depends on the sum of the samples. Power and Standard Deviation (Variance) depend on the sum and squared sum of the samples. Thus, in one embodiment, where Mean, Power, and Variance are the features used, the feature generation engine can compute the features from only the accumulated sum and squared sum results held in memory 520. In one embodiment, logic 530 separately calculates the two results for non-overlapping and overlapping regions for each window. In one embodiment, logic 530 calculates the features from the cumulative sum and squared sum for a window once the window size is full. In one embodiment, data stored for previous windows is overwritten. Thus, in one embodiment, a feature generation engine can extract all necessary features (assuming the three features shown) with a programmable window size and overlap using four buffers (one each for non-overlapping sum, non-overlapping sum squared, overlapping sum, and non-overlapping sum squared) per sensor.

In one embodiment, logic 530 includes three reusable computation blocks: addition, square, and square root. In the example of system 500, the system can instantiate these blocks once and schedule the sharing of the blocks while generating different features. Such an implementation can save power and area. Such an implementation can leverage the fact that in one embodiment, feature generation does not need to be completed before the next data sample comes in (e.g., some number of clock cycles later).

As illustrated, in one embodiment, logic 530 can compute Mean (e.g., signal mean), Variance (e.g., signal standard deviation), and Power (e.g., real power) as follows. For purpose of clarity, lines with different dashes illustrate the flow of logic used to compute the various features. For example, logic 530 computes the Mean along the logical flow of the dashed-dotted line, the Variance along the logical flow of the dashed line, and the Power along the logical flow of the solid line. Accordingly, logic 530 computes the Mean by averaging the sum over the N samples; the Variance by taking the difference of sum squared minus the sum, which is then averaged over the N samples, and the square root of the averaging result; and, the Power by averaging the sum squared over the N samples, and taking the square root of the averaging result.

Figure 6C:
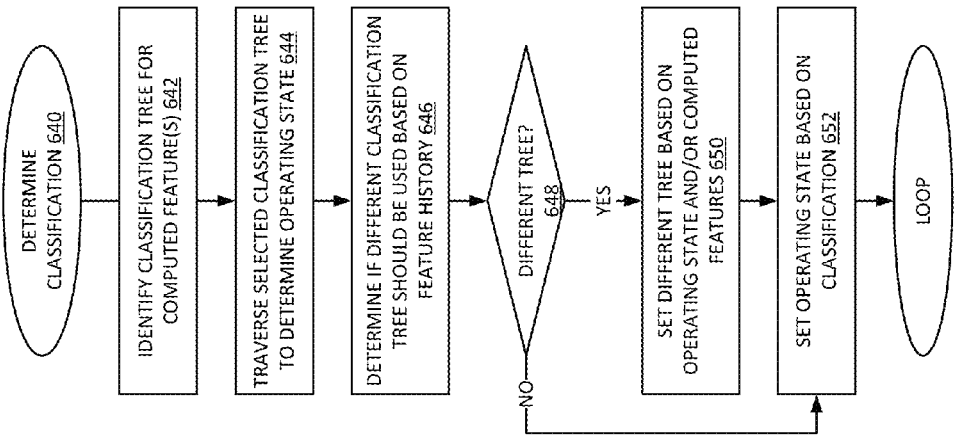
FIG. 6C is a flow diagram of an embodiment of a process for determining a classification for a dynamically programmable AFE.
Figure 6B:
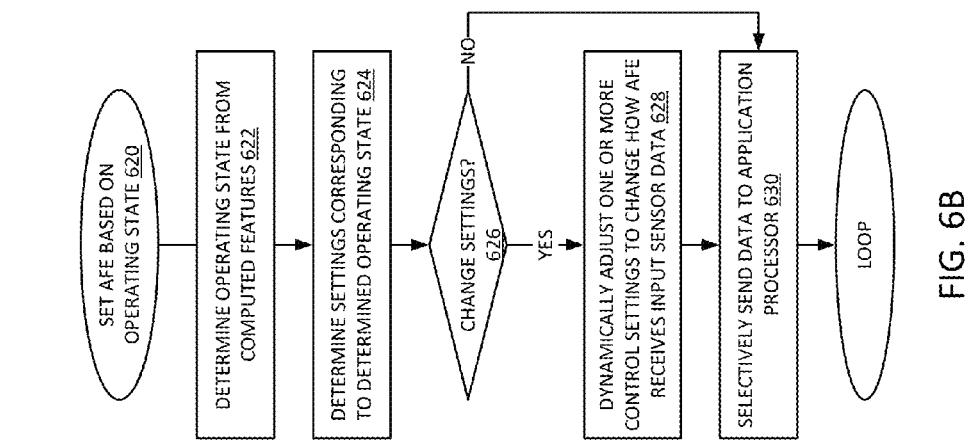
FIG. 6B is a flow diagram of an embodiment of a process for determining an operating state for a dynamically programmable AFE.
Figure 6A:
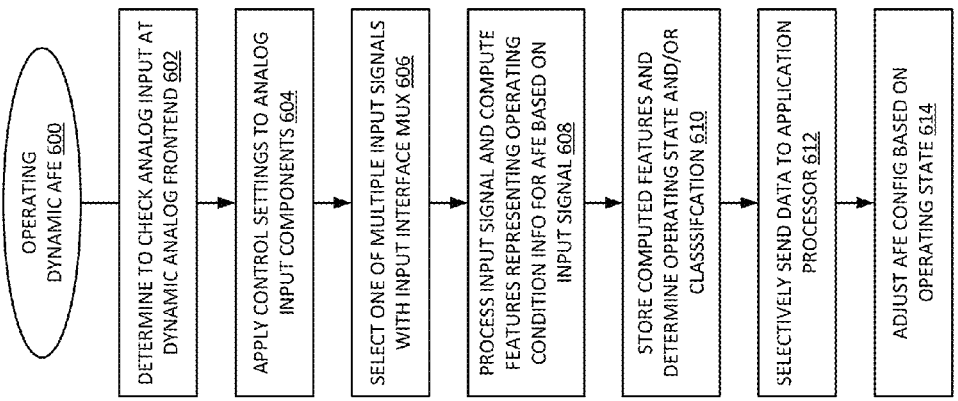
FIG. 6A is a flow diagram of an embodiment of a process for operating a dynamically programmable AFE.

FIG. 6A is a flow diagram of an embodiment of a process for operating a dynamically programmable AFE. Process 600 describes operating a dynamically programmable AFE by determining features of input signals and determining an operating state based on the features. In one embodiment, an AFE circuit is part of a processor, a processing unit, a system on a chip, or other system that interfaces with multiple sensor devices. Specifically, the AFE interfaces with sensors that generate an analog output.

In one embodiment, the AFE determines to check an analog input, 602. In one embodiment, the AFE checks analog inputs at the request of a system-level processor that requests sensor input data. In one embodiment, the AFE continuously monitors the analog inputs, continuously selecting from among the multiple sensor devices to sample the analog input in accordance with a scheduling algorithm. In one embodiment, the AFE monitors the sensors semi-continuously by cycling through inputs on a schedule in accordance with one or more timers or scheduling mechanisms to keep track of which sensor to sample when. Whether by request from an external processor, or by schedule or determination from an internal routine, the AFE can be said to receive an analog input or sample an analog input based on a trigger. The trigger can be the request, timer value, or process determination to sample an analog input.

The AFE applies control settings to analog circuit components, 604 as set by the AFE control. In one embodiment, the AFE provides different control settings for each different input. Thus, the AFE can dynamically adjust sampling operation for each different analog input to be sampled. The AFE applies the current settings to the analog circuit components based on an operating state as determined by the AFE control. In one embodiment, the AFE is multiplexed. Thus, as part of the settings or in conjunction with other settings, the AFE can set an analog multiplexer to sample one of multiple different analog input signals, 606.

In one embodiment, the preprocessor or other AFE control logic processes the input signal and computes features from the input sensor data. The computed features represent operating condition information for the AFE based on the sensor input signal, 608. Thus, each different sensor can correspond to a different operating condition of the AFE. The feature generation engine of the AFE control stores the computed features, and a classification engine or operating state determination engine determines the operating state of the AFE based on stored computed features, 610. In one embodiment, the operating state is unique to each sensor. In one embodiment, the classification engine determines an operating state based on features from multiple sensors.

In one embodiment, the AFE control is or is part of a preprocessor that performs preliminary analysis on the data prior to sending the data to a primary processor or application processor. Thus, the preprocessor can selectively send data to the application processor, 612. In one embodiment, the preprocessing stage determines whether the input data represents significant data based on the operating state. It will be understood that a determination as to what is significant data will vary from sensor to sensor, and from implementation to implementation. The AFE control selectively adjusts one or more parameters of the AFE configuration to adjust its interface operation based on the determined operating state 614. For example, the AFE control can generate one or more control signals to adjust one or more settings related to quality or precision or resolution of the AFE, adjust the sampling precision, bandwidth, resolution, power, and/or some other adjustment.

FIG. 6B is a flow diagram of an embodiment of a process for adjusting a dynamically programmable AFE based on an operating state. Process 620 describes selectively changing AFE configuration, such as what is described at 614 in FIG. 6A. The AFE control logic determines an operating state based on computed features, 622. The computing of the features is performed by performing the storing of data and performing calculations on the stored data. In one embodiment, the AFE control determines what settings of the AFE correspond to the determined operating state, 624. In one embodiment, the AFE control can make such a determination by reference to a LUT or other stored information.

Based on what the settings should be, the AFE control can determine whether any settings need to be changed. In one embodiment, the AFE control changes AFE settings each time it determines a different operating state. If the AFE control determines to change AFE settings, 626 YES branch, the AFE control dynamically adjusts one or more control settings that change how the AFE receives input sensor data, 628. The AFE control can then selectively send data to the application processor, 630. If the AFE control determines not to change AFE settings, 626 NO branch, the AFE control can selectively send data to the application processor, 630. The AFE control can continuously loop through determining whether to adjust AFE settings based on operating state determination. In one embodiment, the process to change AFE settings is triggered each time operating state changes.

FIG. 6C is a flow diagram of an embodiment of a process for determining a classification for a dynamically programmable AFE. Process 640 describes classification of operating state, such as what is described at 612 of FIG. 6A. In one embodiment, the AFE control identifies a classification tree to use for the computed features, 642. The AFE control classification engine can access the features stored by the feature generation engine. The AFE control can then traverse the selected classification tree to determine the operating state, 644.

In one embodiment, the AFE control (via the classification engine) can determine if a different classification tree should be used based on feature history, 646. In one embodiment, such a determination is made to tree hop if the same operating state is selected for a period of time. If the AFE control determines to use a different classification tree, 648 YES branch, the AFE control can set a different tree based on the operating state and/or computed features, 650. The AFE control can then set the operating state based on the classification, 652. If the AFE control determines not to use a different tree, 648 NO branch, the AFE control can set the operating state based on the classification, 652, and continue to loop through determining operating state for newly computed features.

Figure 7:
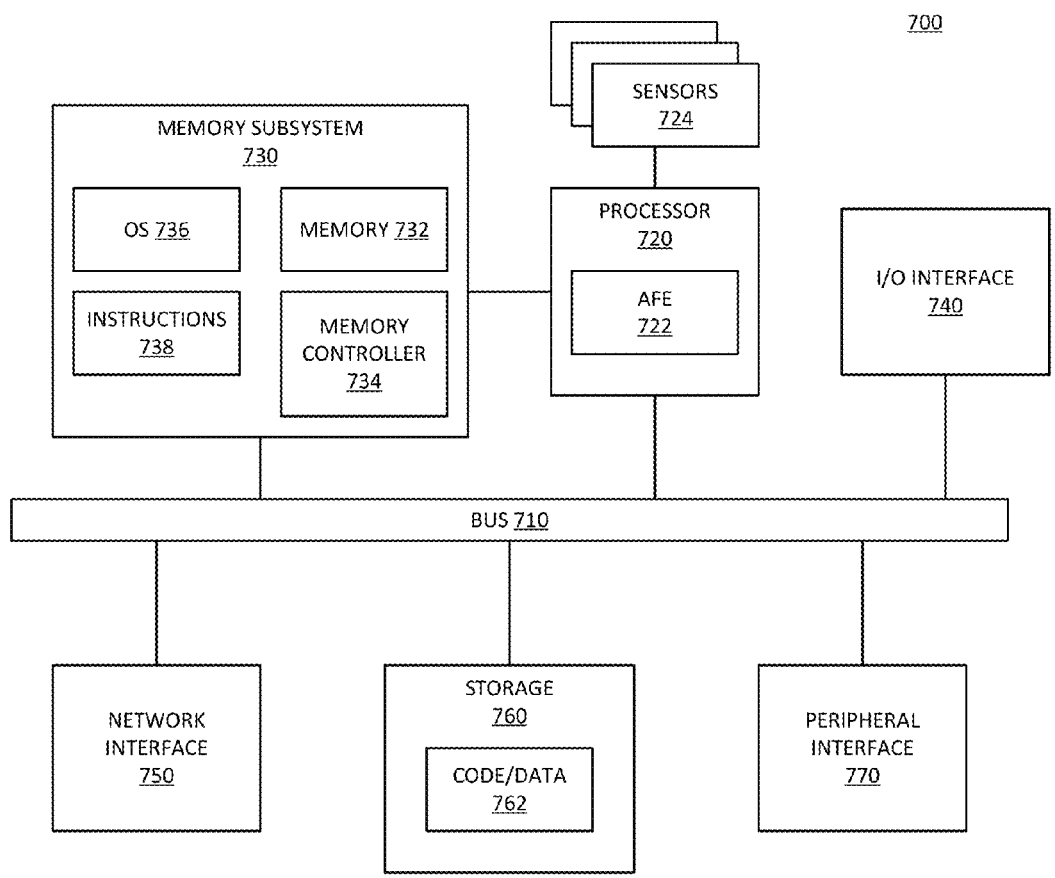
FIG. 7 is a block diagram of an embodiment of a computing system in which a dynamically programmable AFE can be implemented.

FIG. 7 is a block diagram of an embodiment of a computing system in which a dynamically programmable AFE can be implemented. System 700 represents a computing device in accordance with any embodiment described herein, and can be a laptop computer, a desktop computer, a server, a gaming or entertainment control system, a scanner, copier, printer, routing or switching device, or other electronic device. System 700 includes processor 720, which provides processing, operation management, and execution of instructions for system 700. Processor 720 can include any type of microprocessor, central processing unit (CPU), processing core, or other processing hardware to provide processing for system 700. Processor 720 controls the overall operation of system 700, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

Memory subsystem 730 represents the main memory of system 700, and provides temporary storage for code to be executed by processor 720, or data values to be used in executing a routine. Memory subsystem 730 can include one or more memory devices such as read-only memory (ROM), flash memory, one or more varieties of random access memory (RAM), or other memory devices, or a combination of such devices. Memory subsystem 730 stores and hosts, among other things, operating system (OS) 736 to provide a software platform for execution of instructions in system 700. Additionally, other instructions 738 are stored and executed from memory subsystem 730 to provide the logic and the processing of system 700. OS 736 and instructions 738 are executed by processor 720. Memory subsystem 730 includes memory device 732 where it stores data, instructions, programs, or other items. In one embodiment, memory subsystem includes memory controller 734, which is a memory controller to generate and issue commands to memory device 732. It will be understood that memory controller 734 could be a physical part of processor 720.

Processor 720 and memory subsystem 730 are coupled to bus/bus system 710. Bus 710 is an abstraction that represents any one or more separate physical buses, communication lines/interfaces, and/or point-to-point connections, connected by appropriate bridges, adapters, and/or controllers. Therefore, bus 710 can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (commonly referred to as "Firewire"). The buses of bus 710 can also correspond to interfaces in network interface 750.

System 700 also includes one or more input/output (I/O) interface(s) 740, network interface 750, one or more internal mass storage device(s) 760, and peripheral interface 770 coupled to bus 710. I/O interface 740 can include one or more interface components through which a user interacts with system 700 (e.g., video, audio, and/or alphanumeric interfacing). In one embodiment I/O interface 740 includes components that provide a visual and/or tactile display and/or visually perceptible output for a user to interact with system 700. In one embodiment, the display includes a touchscreen device that both provides output to and receives input from a user. In one embodiment, the display includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others.

Network interface 750 provides system 700 the ability to communicate with remote devices (e.g., servers, other computing devices) over one or more networks. Network interface 750 can include an Ethernet adapter, wireless interconnection components, USB (universal serial bus), or other wired or wireless standards-based or proprietary interfaces. Storage 760 can be or include any conventional medium for storing large amounts of data in a nonvolatile manner, such as one or more magnetic, solid state, or optical based disks, or a combination. Storage 760 holds code or instructions and data 762 in a persistent state (i.e., the value is retained despite interruption of power to system 700). Storage 760 can be generically considered to be a "memory," although memory 730 is the executing or operating memory to provide instructions to processor 720. Whereas storage 760 is nonvolatile, memory 730 can include volatile memory (i.e., the value or state of the data is indeterminate if power is interrupted to system 700).

Peripheral interface 770 can include any hardware interface not specifically mentioned above. Peripherals refer generally to devices that connect dependently to system 700.

A dependent connection is one where system 700 provides the software and/or hardware platform on which operation executes, and with which a user interacts.

In one embodiment, processor 720 includes AFE 722, which is a frontend circuit in accordance with any embodiment described herein. AFE 722 interfaces processor 720 to multiple sensors 724, which could be connected, for example, via I/O interface 740 and/or peripheral interface 770. In one embodiment, sensors 724 are connected via an interface not directed shown in system 700. AFE 722 is dynamically configurable, which allows the frontend circuit to adjust its operation based on a determined operating state. AFE 722 includes AFE control (not specifically shown) that generates features from input sensor data, and determines an operating state from the generated features. Based on the operating state, the AFE control adjusts operation of the AFE to improve the interface and to save power.

Figure 8:
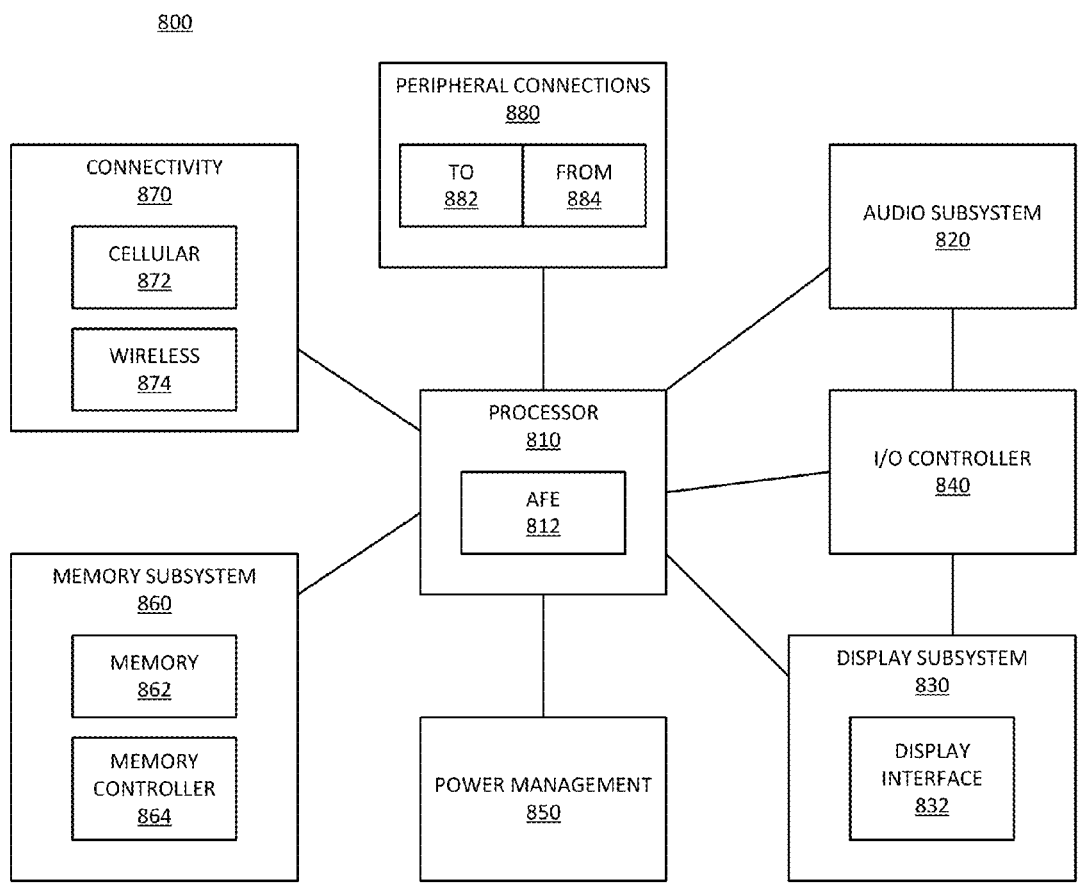
FIG. 8 is a block diagram of an embodiment of a mobile device in which a dynamically programmable AFE can be implemented.

FIG. 8 is a block diagram of an embodiment of a mobile device in which a dynamically programmable AFE can be implemented. Device 800 represents a mobile computing device, such as a computing tablet, a mobile phone or smartphone, a wireless-enabled e-reader, wearable computing device, or other mobile device. It will be understood that certain of the components are shown generally, and not all components of such a device are shown in device 800.

Device 800 includes processor 810, which performs the primary processing operations of device 800. Processor 810 can include one or more physical devices, such as microprocessors, application processors, microcontrollers, programmable logic devices, or other processing means. The processing operations performed by processor 810 include the execution of an operating platform or operating system on which applications and/or device functions are executed. The processing operations include operations related to I/O (input/output) with a human user or with other devices, operations related to power management, and/or operations related to connecting device 800 to another device. The processing operations can also include operations related to audio I/O and/or display I/O.

In one embodiment, device 800 includes audio subsystem 820, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into device 800, or connected to device 800. In one embodiment, a user interacts with device 800 by providing audio commands that are received and processed by processor 810.

Display subsystem 830 represents hardware (e.g., display devices) and software (e.g., drivers) components that provide a visual and/or tactile display and/or visually perceptible output for a user to interact with the computing device. Display subsystem 830 includes display interface 832, which includes the particular screen or hardware device used to provide a display to a user. In one embodiment, display interface 832 includes logic separate from processor 810 to perform at least some processing related to the display. In one embodiment, display subsystem 830 includes a touchscreen device that both provides output to and receives input from a user. In one embodiment, display subsystem 830 includes a high definition (HD) display that provides an output to a user. High definition can refer to a display having a pixel density of approximately 100 PPI (pixels per inch) or greater, and can include formats such as full HD (e.g., 1080p), retina displays, 4K (ultra high definition or UHD), or others.

I/O controller 840 represents hardware devices and software components related to interaction with a user. I/O controller 840 can operate to manage hardware that is part of audio subsystem 820 and/or display subsystem 830. Additionally, I/O controller 840 illustrates a connection point for additional devices that connect to device 800 through which a user might interact with the system. For example, devices that can be attached to device 800 might include microphone devices, speaker or stereo systems, video systems or other display device, keyboard or keypad devices, or other I/O devices for use with specific applications such as card readers or other devices.

As mentioned above, I/O controller 840 can interact with audio subsystem 820 and/or display subsystem 830. For example, input through a microphone or other audio device can provide input or commands for one or more applications or functions of device 800. Additionally, audio output can be provided instead of or in addition to display output. In another example, if display subsystem includes a touchscreen, the display device also acts as an input device, which can be at least partially managed by I/O controller 840. There can also be additional buttons or switches on device 800 to provide I/O functions managed by I/O controller 840.

In one embodiment, I/O controller 840 manages devices such as accelerometers, cameras, light sensors or other environmental sensors, gyroscopes, global positioning system (GPS), or other hardware that can be included in device 800. The input can be part of direct user interaction, as well as providing environmental input to the system to influence its operations (such as filtering for noise, adjusting displays for brightness detection, applying a flash for a camera, or other features). In one embodiment, device 800 includes power management 850 that manages battery power usage, charging of the battery, and features related to power saving operation.

Memory subsystem 860 includes memory device(s) 862 for storing information in device 800. Memory subsystem 860 can include nonvolatile (state does not change if power to the memory device is interrupted) and/or volatile (state is indeterminate if power to the memory device is interrupted) memory devices. Memory 860 can store application data, user data, music, photos, documents, or other data, as well as system data (whether long-term or temporary) related to the execution of the applications and functions of system 800. In one embodiment, memory subsystem 860 includes memory controller 864 (which could also be considered part of the control of system 800, and could potentially be considered part of processor 810). Memory controller 864 includes a scheduler to generate and issue commands to memory device 862.

Connectivity 870 includes hardware devices (e.g., wireless and/or wired connectors and communication hardware) and software components (e.g., drivers, protocol stacks) to enable device 800 to communicate with external devices. The external device could be separate devices, such as other computing devices, wireless access points or base stations, as well as peripherals such as headsets, printers, or other devices.

Connectivity 870 can include multiple different types of connectivity. To generalize, device 800 is illustrated with cellular connectivity 872 and wireless connectivity 874. Cellular connectivity 872 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, LTE (long term evolution—also referred to as "4G"), or other cellular service standards. Wireless connectivity 874 refers to wireless connectivity that is not cellular, and can include personal area networks (such as Bluetooth), local area networks (such as WiFi), and/or wide area networks (such as WiMax), or other wireless communication. Wireless communication refers to transfer of data through the use of modulated electromagnetic radiation through a non-solid medium. Wired communication occurs through a solid communication medium.

Peripheral connections 880 include hardware interfaces and connectors, as well as software components (e.g., drivers, protocol stacks) to make peripheral connections. It will be understood that device 800 could both be a peripheral device ("to" 882) to other computing devices, as well as have peripheral devices ("from" 884) connected to it. Device 800 commonly has a "docking" connector to connect to other computing devices for purposes such as managing (e.g., downloading and/or uploading, changing, synchronizing) content on device 800. Additionally, a docking connector can allow device 800 to connect to certain peripherals that allow device 800 to control content output, for example, to audiovisual or other systems.

In addition to a proprietary docking connector or other proprietary connection hardware, device 800 can make peripheral connections 880 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

In one embodiment, processor 810 includes AFE 812, which is a frontend circuit in accordance with any embodiment described herein. AFE 812 interfaces processor 810 to multiple sensors (not specifically shown, but could be connected via I/O controller 840). AFE 812 is dynamically configurable, which allows the frontend circuit to adjust its operation based on a determined operating state. AFE 812 includes AFE control (not specifically shown) that generates features from input sensor data, and determines an operating state from the generated features. Based on the operating state, the AFE control adjusts operation of the AFE to improve the interface and to save power.

In one aspect, a method for operating an analog frontend (AFE) includes: selecting one of multiple sensors coupled to the AFE; receiving input sensor data from the sensor; computing features for the sensor based on the input sensor data, the features representing selected operating condition information of the AFE for the sensor; determining one of multiple discrete operating states of the AFE for the sensor based on the computed features; and dynamically adjusting operation of the AFE to interface with the sensor based on the determined operating state, including controlling a configuration of the AFE that controls how the AFE receives the input sensor data from the sensor.

In one embodiment, wherein computing features further comprises: computing at least signal mean, signal standard deviation, and real power. In one embodiment, wherein computing features further comprises: computing features by accumulating data for a window of time. In one embodiment, wherein accumulating data for the window of time further comprises: accumulating data for both an overlapping window of time and consecutive non-overlapping windows of time. In one embodiment, wherein determining one of multiple discrete operating states comprises: classifying operating condition information into the multiple discrete operating states by traversing a decision tree based on stored computed features. In one embodiment, wherein classifying the operating condition information comprises: switching among one of multiple decision trees based on computed operating condition information. In one embodiment, wherein the sensor is one of multiple sensors, and wherein receiving the input sensor data comprises receiving input sensor data from multiple sensors; wherein the determining the one of multiple discrete operating states comprises determining based on the input sensor data from the multiple sensors. In one embodiment, wherein controlling the configuration of the AFE comprises: dynamically changing a setting for a sampling resolution of the AFE with respect to the sensor. In one embodiment, wherein controlling the configuration of the AFE comprises: dynamically changing a setting for a bandwidth of the AFE with respect to the sensor. In one embodiment, wherein controlling the configuration of the AFE comprises: selectively enabling and disabling hardware components of the AFE when interfacing with the sensor. In one embodiment, wherein controlling the configuration of the AFE comprises: dynamically switching between a high-precision component and a low-precision counterpart component of the AFE wherein interfacing with the sensor. In one embodiment, wherein controlling the configuration of the AFE comprises: dynamically switching between a high-power component and a low-power counterpart component of the AFE wherein interfacing with the sensor.

In one aspect, a frontend circuit includes: multiple hardware input interfaces to receive multiple unprocessed input sensor data from multiple sensors; analog processing hardware to select one of the multiple sensors and process input sensor data for the selected sensor; and a processor to compute features for the sensor based on the input sensor data, the features representing selected operating condition information of the analog processing hardware for the sensor; determine one of multiple discrete operating states of the analog processing hardware for the sensor based on the computed features; and dynamically adjust operation of the analog processing hardware to interface with the sensor based on the determined operating state, including controlling a configuration of the analog processing hardware that controls how the analog processing hardware receives the input sensor data from the sensor.

In one embodiment, wherein the processor to compute features further comprises the processor to perform one or more of accumulating data for a window of time or computing at least signal mean, signal standard deviation, and real power. In one embodiment, wherein the processor to compute features further comprises the processor to accumulate data for a window of time. In one embodiment, wherein the processor is to accumulate data for both an overlapping window of time and consecutive non-overlapping windows of time. In one embodiment, further comprising the processor to classify operating condition information into the multiple discrete operating states by traversing a decision tree based on stored computed features. In one embodiment, wherein the processor to classify the operating condition information comprises the processor to switch among one of multiple decision trees based on computed operating condition information. In one embodiment, wherein the sensor is one of multiple sensors, and wherein the multiple hardware input interfaces are to receive the input sensor data from multiple sensors; wherein the processor is to determine the one of multiple discrete operating states based on the input sensor data from the multiple sensors. In one embodiment, wherein the processor is to control the configuration of the analog processing hardware including dynamically changing a setting for a sampling resolution of the analog processing hardware with respect to the sensor. In one embodiment, wherein the processor is to control the configuration of the analog processing hardware including dynamically changing a setting for a bandwidth of the analog processing hardware with respect to the sensor. In one embodiment, wherein the processor is to control the configuration of the analog processing hardware including selectively enabling and disabling hardware components of the analog processing hardware when interfacing with the sensor. In one embodiment, wherein the processor is to control the configuration of the analog processing hardware including dynamically switching between a high-precision component and a low-precision counterpart component of the analog processing hardware wherein interfacing with the sensor. In one embodiment, wherein the processor is to control the configuration of the analog processing hardware including dynamically switching between a high-power component and a low-power counterpart component of the analog processing hardware wherein interfacing with the sensor.

In one aspect, a system includes: a frontend circuit comprising: multiple hardware input interfaces to receive multiple unprocessed input sensor data from multiple sensors; analog processing hardware to select one of the multiple sensors and process input sensor data for the selected sensor; and a processor to compute features for the sensor based on the input sensor data, the features representing selected operating condition information of the analog processing hardware for the sensor; determine one of multiple discrete operating states of the analog processing hardware for the sensor based on the computed features; and dynamically adjust operation of the analog processing hardware to interface with the sensor based on the determined operating state, including controlling a configuration of the analog processing hardware that controls how the analog processing hardware receives the input sensor data from the sensor; and a touchscreen display configured to generate a display based on data received at the frontend circuit. Any embodiment described with respect to the frontend circuit can also apply to the system.

In one aspect, an article of manufacture comprising a computer readable storage medium having content stored thereon, which when accessed causes a computing device to perform operations for an analog frontend (AFE), including: selecting one of multiple sensors coupled to the AFE; receiving input sensor data from the sensor; computing features for the sensor based on the input sensor data, the features representing selected operating condition information of the AFE for the sensor; determining one of multiple discrete operating states of the AFE for the sensor based on the computed features; and dynamically adjusting operation of the AFE to interface with the sensor based on the determined operating state, including controlling a configuration of the AFE that controls how the AFE receives the input sensor data from the sensor. Any embodiment described with respect to the method for the AFE can also apply to the article of manufacture.

In one aspect, an apparatus for operating an analog frontend (AFE) includes: means for selecting one of multiple sensors coupled to the AFE; means for receiving input sensor data from the sensor; means for computing features for the sensor based on the input sensor data, the features representing selected operating condition information of the AFE for the sensor; means for determining one of multiple discrete operating states of the AFE for the sensor based on the computed features; and means for dynamically adjusting operation of the AFE to interface with the sensor based on the determined operating state, including controlling a configuration of the AFE that controls how the AFE receives the input sensor data from the sensor. Any embodiment described with respect to the method for the AFE can also apply to the apparatus.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible. A component can be configured to perform an operation or interact with another component. A component can be configured through hardware means or through software means or a combination. A component can be configured through physical connections provided via a circuit or interconnect device.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for operating an analog frontend (AFE), comprising:
    selecting one of multiple sensors coupled to the AFE;
    receiving input sensor data from the sensor;
    computing features for the sensor based on the input sensor data, the features representing selected operating condition information of the AFE for the sensor;
    determining one of multiple discrete operating states of the AFE for the sensor based on the computed features; and
    dynamically adjusting operation of the AFE to interface with the sensor based on the determined operating state, including controlling a configuration of the AFE that controls how the AFE receives the input sensor data from the sensor.

2. The method of claim 1, wherein computing features further comprises:
    computing at least signal mean, signal standard deviation, and real power.

3. The method of claim 1, wherein computing features further comprises:
    computing features by accumulating data for a window of time.

4. The method of claim 3, wherein accumulating data for the window of time further comprises:
    accumulating data for both an overlapping window of time and consecutive non-overlapping windows of time.

5. The method of claim 1, wherein determining one of multiple discrete operating states comprises:
    classifying operating condition information into the multiple discrete operating states by traversing a decision tree based on stored computed features.

6. The method of claim 5, wherein classifying the operating condition information comprises:
    switching among one of multiple decision trees based on computed operating condition information.

7. The method of claim 1, wherein the sensor is one of multiple sensors, and wherein receiving the input sensor data comprises receiving input sensor data from multiple sensors;
    wherein the determining the one of multiple discrete operating states comprises determining based on the input sensor data from the multiple sensors.

8. The method of claim 1, wherein controlling the configuration of the AFE comprises:
    dynamically changing a setting for a sampling resolution of the AFE with respect to the sensor.

9. The method of claim 1, wherein controlling the configuration of the AFE comprises:
    dynamically changing a setting for a bandwidth of the AFE with respect to the sensor.

10. The method of claim 1, wherein controlling the configuration of the AFE comprises:
    selectively enabling and disabling hardware components of the AFE when interfacing with the sensor.

11. The method of claim 1, wherein controlling the configuration of the AFE comprises:
    dynamically switching between a high-precision component and a low-precision counterpart component of the AFE wherein interfacing with the sensor.

12. The method of claim 1, wherein controlling the configuration of the AFE comprises:
    dynamically switching between a high-power component and a low-power counterpart component of the AFE wherein interfacing with the sensor.

13. A frontend circuit comprising:
    multiple hardware input interfaces to receive multiple unprocessed input sensor data from multiple sensors;
    analog processing hardware to select one of the multiple sensors and process input sensor data for the selected sensor; and
    a processor to compute features for the sensor based on the input sensor data, the features representing selected operating condition information of the analog processing hardware for the sensor; determine one of multiple discrete operating states of the analog processing hardware for the sensor based on the computed features; and dynamically adjust operation of the analog processing hardware to interface with the sensor based on the determined operating state, including controlling a configuration of the analog processing hardware that controls how the analog processing hardware receives the input sensor data from the sensor.

14. The frontend circuit of claim 13, wherein the processor to compute features further comprises the processor to perform one or more of accumulating data for a window of time or computing at least signal mean, signal standard deviation, and real power.

15. The frontend circuit of claim 13, further comprising the processor to
    classify operating condition information into the multiple discrete operating states by traversing a decision tree based on stored computed features.

16. The frontend circuit of claim 13, wherein the sensor is one of multiple sensors, and wherein the multiple hardware input interfaces are to receive the input sensor data from multiple sensors;
    wherein the processor is to determine the one of multiple discrete operating states based on the input sensor data from the multiple sensors.

17. The frontend circuit of claim 13, wherein the processor is to control the configuration of the analog processing hardware including one or more of dynamically changing a setting for a sampling resolution of the analog processing hardware with respect to the sensor, dynamically changing a setting for a bandwidth of the analog processing hardware with respect to the sensor, selectively enabling and disabling hardware components of the analog processing hardware when interfacing with the sensor, dynamically switching between a high-precision component and a low-precision counterpart component of the analog processing hardware wherein interfacing with the sensor, or dynamically switching between a high-power component and a low-power counterpart component of the analog processing hardware wherein interfacing with the sensor.

18. A system comprising:
    a frontend circuit comprising:
        multiple hardware input interfaces to receive multiple unprocessed input sensor data from multiple sensors;
        analog processing hardware to select one of the multiple sensors and process input sensor data for the selected sensor; and
        a processor to compute features for the sensor based on the input sensor data, the features representing selected operating condition information of the analog processing hardware for the sensor; determine one of multiple discrete operating states of the analog processing hardware for the sensor based on the computed features; and dynamically adjust operation of the analog processing hardware to interface with the sensor based on the determined operating state, including controlling a configuration of the analog processing hardware that controls how the analog processing hardware receives the input sensor data from the sensor; and a touchscreen display configured to generate a display based on data received at the frontend circuit.

19. The system of claim 18, wherein the processor to compute features further comprises the processor to perform one or more of accumulating data for a window of time or computing at least signal mean, signal standard deviation, and real power.

20. The system of claim 18, further comprising the processor to
classify operating condition information into the multiple discrete operating states by traversing a decision tree based on stored computed features.

21. The system of claim 18, wherein the sensor is one of multiple sensors, and wherein the multiple hardware input interfaces are to receive the input sensor data from multiple sensors;
wherein the processor is to determine the one of multiple discrete operating states based on the input sensor data from the multiple sensors.

22. The system of claim 18, wherein the processor is to control the configuration of the analog processing hardware including one or more of dynamically changing a setting for a sampling resolution of the analog processing hardware with respect to the sensor, dynamically changing a setting for a bandwidth of the analog processing hardware with respect to the sensor, selectively enabling and disabling hardware components of the analog processing hardware when interfacing with the sensor, dynamically switching between a high-precision component and a low-precision counterpart component of the analog processing hardware wherein interfacing with the sensor, or dynamically switching between a high-power component and a low-power counterpart component of the analog processing hardware wherein interfacing with the sensor.

* * * * *